July 26, 1966 C. BANGERT, JR 3,263,132
CIRCUIT BREAKER LOAD CENTER
Filed Dec. 24, 1964 2 Sheets-Sheet 1

INVENTOR.
CHARLES BANGERT, JR.
BY Robert F. Casey
ATTORNEY

July 26, 1966     C. BANGERT, JR     3,263,132
CIRCUIT BREAKER LOAD CENTER

Filed Dec. 24, 1964     2 Sheets-Sheet 2

INVENTOR.
CHARLES BANGERT, JR.
BY Robert F. Casey
ATTORNEY

United States Patent Office 3,263,132
Patented July 26, 1966

3,263,132
CIRCUIT BREAKER LOAD CENTER
Charles Bangert, Jr., West Hartford, Conn., assignor to General Electric Company, a corporation of New York
Filed Dec. 24, 1964, Ser. No. 420,877
11 Claims. (Cl. 317—119)

This invention relates to electrical control panel board assemblies and load centers and more particularly to panel boards and load centers which are adapted to and designed to receive circuit breakers by plug-in engagement of cooperating electrical contacts.

Panel boards and load centers of the type referred to may be connected to a source of electrical energy of one or several phases and circuit breakers used in such panel boards are usually manufactured in a variety of ampere ratings, as well as several modular sizes which vary principally in width of the outside dimension. Accordingly, a great many combinations of phase of electrical source, ampere rating, and modular size are conceivable and, may be selectively desirable for particular applications.

It is an object of the present invention to provide a panel board load center wherein selected portions may be segregated to receive a limited number of circuit breakers of a particular modular size.

Another object of the present invention is to provide a panel board for connection to multipole electrical sources and adapted to receive modular size circuit breakers combined in multipole assembly.

A further object of this present invention is to provide a panel board and circuit breakers adapted for connection of an assembly of two one-half module size circuit breakers to adjacent upstanding blade contacts as a two-pole one module size circuit breaker.

Another object of the present invention is to provide an electric circuit breaker panel board and circuit breakers to be mounted in engagement on such a panel board which afford mutual connection in a broad variety of selectable combinations as to ampere rating, phase, and modular size both in single and multipole usages.

In accordance with my invention a panel board is provided comprising a generally planar base and including suitable insulating means carried on the base and supporting a plurality of electrical contacts. Each of the electrical contacts comprises two spaced blade members extending generally normal to the plane of the base and being joined by a common bottom portion in a generally U-shaped channel configuration. The blades are centrally positioned on the panel board and aligned in parallel relationship to each other. In accordance with the invention in one form, at least one pair of blade members may be offset from each other with respect to the central axis of the panel board. This arrangement of offset blades provides a means of segregating a selected portion of the panel board so that a limited number of circuit breakers may be connected in that segregated portion.

Additionally, the panel board of the present invention is adapted to be connectable to a source of electrical energy having one or more phases. Accordingly, an array of contact members may include parallel and adjacent blade members supplied from two different phases of electrical energy. The present invention includes circuit breakers of different modular sizes, the smaller modular size having an insulating casing adapted to receive one panel board blade member and the larger modular size having an insulating casing adapted to receive two adjacent, spaced parallel blade members, but having only one electrical contact means disposed in each such insulating casing so that it is impossible for such a larger modular size circuit breaker to be inadvertently electrically connected across two different phases of electrical energy supplied to adjacent blade members. Moreover, the circuit breakers of the present invention are adapted to use in several modular sizes combined in a multipole assembly. Typically, such an assembly of modular size circuit breaker units may be plugged into engagement with a plurality of adjacent parallel blade members configured and disposed on a panel board load center in accordance with the concept of the present invention and being supplied by a three-phase source of electrical energy. Thus the present invention affords the use of circuit breakers in combination of different modular sizes and a broad variety of selectable aggregate and discrete ampere ratings to be used in combination as a multipole, circuit breaker assembly.

The invention will be more fully understood from the following detailed description and its scope will be pointed out in the appended claims.

Figure 1:
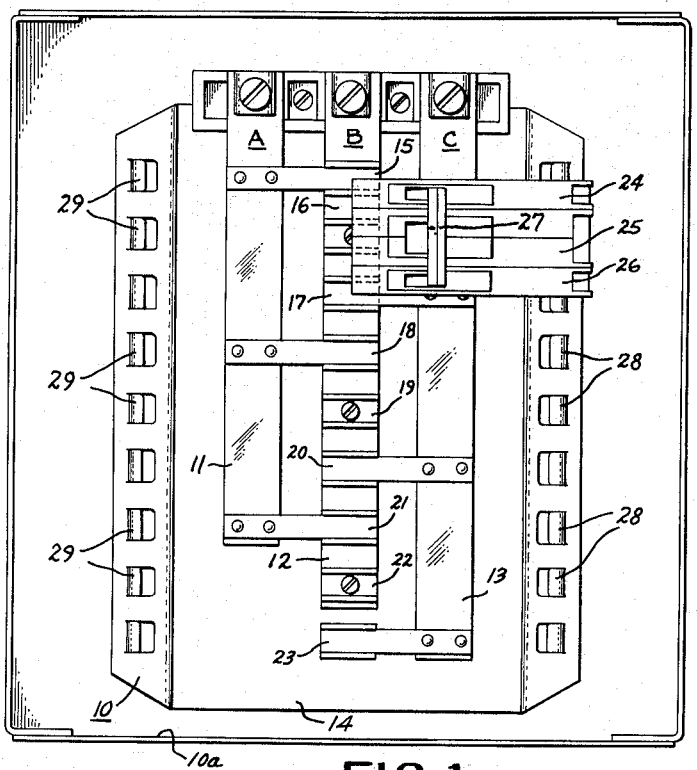
FIGURE 1 is a plan view of a panel board load center including contact blade members disposed and configured as conceived by the present invention.

Referring now to FIGURE 1, there is shown a panel board load center which comprises a base 10 mounted in a suitable enclosure 10a and supporting three bus bars 11, 12 and 13. Underlying the bus bars is a suitable insulation as illustrated at 14. The bus bars 11, 12 and 13 support a plurality of electrical contacts 15, 16, 17, 18, 19, 20, 21, 22 and 23, each of which comprises two spaced blade members extending generally normal to the plane of the base 10 and joined by a common bottom portion in a generally U-shaped, channel configuration. The paired blade members of the electrical contacts 15, 16, 17, 18, 19, 20, 21, 22 and 23 are mutually coextensive and arranged in a parallel relationship and centrally positioned on the panel board. Circuit breakers 24, 25 and 26 are shown in engagement with the blade members of the contacts 15, 16 and 17, respectively. It will be noted that circuit breakers 24 and 26 are of a smaller modular size while circuit breaker 25 is of a larger modular size which is substantially twice the width of the smaller modular size circuit breakers 24 and 26. All three circuit breakers 24, 25 and 26 are enclosed in insulating casings which it can be seen, have sidewalls of substantially the same dimensions and differ modularly as to width. The three circuit breakers 24, 25 and 26 are joined by a common handle tie 27 for reasons which will be more fully understood by the explanation which follows.

The panel board illustrated in FIGURE 1 also includes suitable retaining means as shown at 28 on the right hand flange of the panel board base 10 and 29 on the left hand flange of the panel board base 10. The retaining means 28 and 29 are configured and adapted to receive a lug on the insulating casing of a circuit breaker such as those shown at 24, 25 and 26, allowing the circuit breaker to be rotated about its point of engagement with the retaining means for electrical contact and engagement with one of the blade members of the electrical contacts centrally positioned on the panel board. As will be appreciated, the panel board of the present invention is preferably so configured as to accommodate the engagement of circuit breakers on either side of the centrally positioned electrical contacts and their paired, parallel blade members. Thus, the panel board illustrated in FIGURE 1 is adapted to accept nine circuit breakers of the larger modular size on each side or eighteen circuit breakers of the smaller modular size on each side, or any equivalent modular combination of larger and smaller modular size circuit breakers. The smaller modular size circuit breaker nominally requires a space approximately equal to the distance between centers of adjacent blade members, while the larger modular size circuit breaker requires approximately twice that space, as can be seen from the plan view of FIGURE 1.

Figure 2:
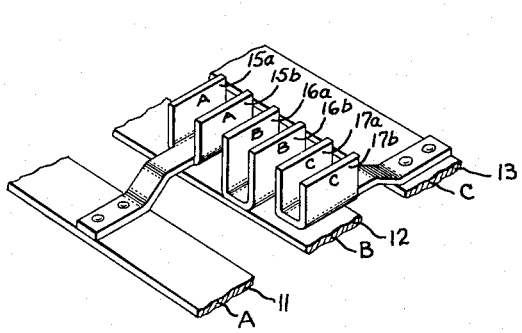
FIGURE 2 is a perspective view of a portion of the panel board of FIGURE 1.

The electrical contacts 15, 18 and 21 are supported and electrically connected to bus bar 11 while the electrical contacts 16, 19 and 22 are supported by and are in electrical contact with the bus bar 12. The electrical contacts 17, 20 and 23 are supported upon and in electrical contact with the bus bar 13. Accordingly, the bus bars 11, 12 and 13, being electrically isolated from one another, may be connected to different phases of a source of electrical energy such as, for instance, a three phase, alternating current source. In such an arrangement of connection with a three-phase source of electrical energy, it is apparent that the circuit breakers 24, 25 and 26 will be supplied by three different phases of electrical energy. The manner of such arrangement and connection may perhaps be better seen from enlarged scale views of FIGURES 2 and 3. FIGURE 2 illustrates a portion of the bus bar and electrical contact arrangement of the panel board of FIGURE 1 in perspective view showing a portion of bus bars 11, 12 and 13 and the connection of electrical contacts 15, 16 and 17, respectively, to those three bus bars.

Assuming that the bus bars 11, 12 and 13 are connected to phases A, B and C of a source of electrical energy, it will be apparent that the blade members 15a and 15b are supplied with phase A, blade members 16a and 16b are supplied with phase B, and the blade members 17a and 17b are supplied with phase C. It should also be noted that while the central bus bar 12 is aligned immediately beneath all the blade members of contacts 15, 16 and 17, it is in electrical contact only with the blades 16a and 16b which it supports. The blades 15a and 15b are supported on the arm of electrical contact 15 so as to be positiioned above the bus bar 12 and electrically isolated therefrom. Similarly, the blades 17a and 17b are supported on the arm of electrical contact 17 spaced apart from bus bar 12 and electrically isolated in a like manner.

Figure 3:
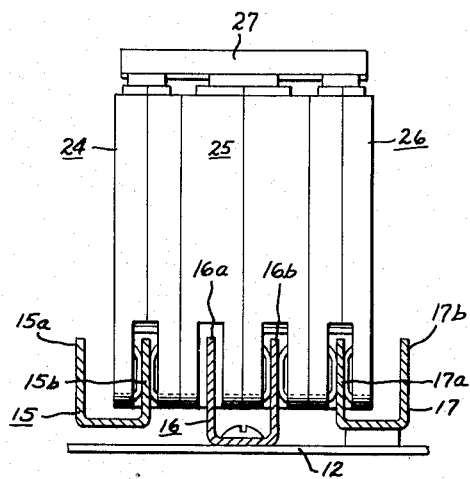
FIGURE 3 is a partially cross-sectional end view of the panel board of FIGURE 1 showing three modular size circuit breakers combined as a multipole circuit breaker assembly in engagement with a panel board connected to a source of three-phase electrical energy.

FIGURE 3 is a partially cross-sectional view of a portion of the panel board assembly of FIGURE 1 illustrating the manner in which circuit breakers and a panel board of the present invention may be employed so as to combine several modular sizes of circuit breakers into a multipole circuit breaker assembly having a common handle tie and engageable with contacts supplied from different phases of a source of electrical energy. In FIGURE 3 there is illustrated the three circuit breakers 24, 25 and 26 of FIGURE 1. The three circuit breakers 24, 25 and 26, it will be noted, are enclosed in insulating casings which have side walls of substantially the same dimensions, but vary in width modularly, circuit breakers 24 and 26 being nominally one-half the width of circuit breakers 25. All three circuit breakers 24, 25 and 26 are operably engaged with one another through a common handle tie 27. Such a three pole common trip circuit breaker assembly is engageable with adjacent panel board electrical contacts 15, 16 and 17. Circuit breaker 24 is shown as having appropriate electrical contact means in engagement with blade member 15b while circuit breaker 25 of the larger modular size is shown as having an appropriate electrical contact in engagement with blade member 16b. It should be noted however, that circuit breaker 25, though recessed to receive the adjacent blade member 16a, does not have electrical contact means in the second recess of its insulating casing. Circuit breaker 26 of the same smaller modular size as circuit breaker 24 has its electrical contact means in engagement with blade member 17a. Thus with the adjacent electrical contacts 15, 16 and 17 connected to three different phases of a source of electrical energy as is explained in connection with FIGURES 1 and 2, the three pole circuit breaker assembly as shown in FIGURE 3 is adaptable to engagement with three different phases of a source of electrical energy.

As will be apparent to those skilled in the art, the larger modular size circuit breaker 25 could as well be positioned on the right hand side of the combination illustrated in FIGURE 3 to engage the blade member 17a of electrical contact 17, while the second recess of its insulating casing receives contact blade member 16b. The two smaller circuit breakers 24 and 26 may then be arranged in side by side relationship to engage the adjacent blade members 16a and 15b. In such an arrangement the engagement of the larger modular size circuit breaker 25 with the blade member 16b of the panel board contact means 16 would provide no electrical contact therewith and thus the two different phases of electrical energy connected to the adjacent panel board electrical contact means 16 and 17 would not be short circuited. It will be evident therefore that the unique arrangement of different modular size circuit breakers in a multipole circuit breaker assembly in accordance with the concept of the present invention affords a wide variety of selectable ampere ratings both in the aggregate ampere rating of the assembly and also for the individual phases to which the discrete circuit breakers are connected. As will be apparent to those skilled in the art, either of the combinations previously described, providing three pole circuit breaker assemblies, will result in a four times modular size of circuit breaker assembly. In accordance with circuit breakers in general usage, a typical instance of such combined size may be nominally two inches, i.e., the aggregate of two nominally one-half inch wide circuit breakers and one nominally one-inch wide circuit breaker. It should be noted, however, that the concept of the present invention is, of course, not limited to such absolute or nominal values but is conceived as being based on a module size which may be one inch, one-half inch or any other convenient and conventional module size.

Figure 4:
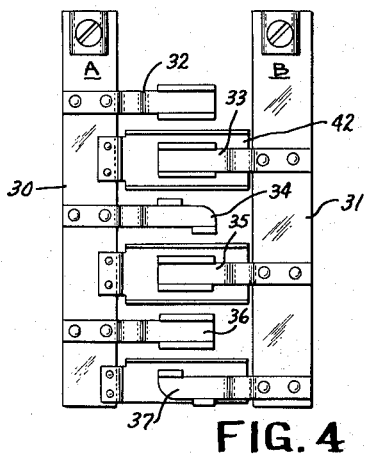
FIGURE 4 is a plan view of bus bars supporting electrical contacts in an arrangement for the load center of a panel board as conceived by the present invention.
Figure 5:
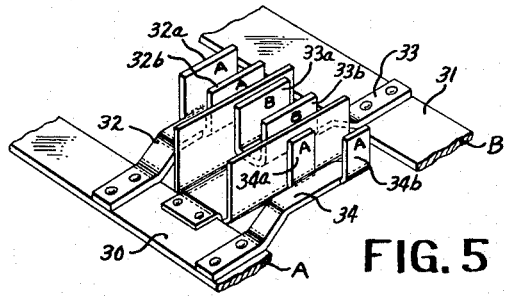
FIGURE 5 is a perspective view of a portion of the arrangement of bus bars and electrical contacts of FIGURE 4.

Referring now to FIGURE 4, there is illustrated two bus bars 30 and 31 supporting a plurality of electrical contacts 32, 33, 34, 35, 36 and 37, each of which comprises two spaced blade members joined by a common bottom portion in a generally U-shaped channel configuration. The electrical contacts 32, 33, 35 and 36 comprise blade members which are mutually coextensive in their parallel relationship. However, it will be noted that electrical contacts 34 and 37 are each comprised of a pair of extending blade members which are offset from each other with respect to the central axis of the panel board arrangement. These configurations can perhaps best be seen from the enlarged scale perspective illustration of FIGURE 5 which shows a portion of the panel board arrangement of FIGURE 4. In FIGURES 4 and 5 the same numerical designations indicate like members. As may be seen from FIGURE 5 electrical contact 32 comprises two opposed parallel blade members 32a and 32b which are centrally positioned and are aligned in parallel relationship to each other. Similarly, electrical contact 33 is comprised of two blade members 33a and 33b configured and disposed similarly to the electrical contact 32, the difference between electrical contacts 32 and 33 being that the former is connected to bus bar 30 while the latter is connected to bus bar 31. Accordingly, the two bus bars 30 and 31 may be connected to different phases of an electrical source so that the contact blade members 32a and 32b are energized by a different phase of electrical energy than the contact blade members 33a and 33b. Electrical contact 34 is also connected to and supported by bus bar 30 and similarly has two blade members 34a and 34b which are spaced from each other in parallel relationship, but the blade members 34a and 34b are offset with respect to the central axis of the panel board arrangement as contrasted to the blade members of electrical contacts 32 and 33 which are mutually coextensive. The reason for, and the effect of having offset blade members such as 34a and 34b of the electrical contact 34 will be explained more fully hereinafter.

Figure 6:
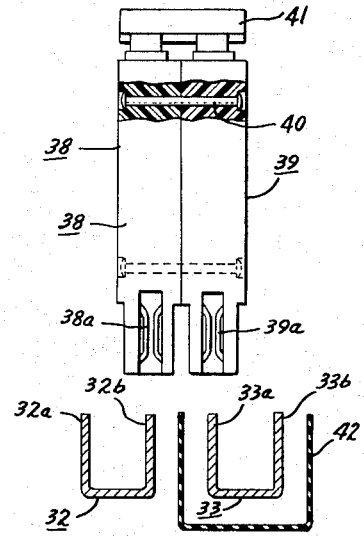
FIGURE 6 is a partially cross-sectional schematic illustration of an assembly of two aligned for engagement with adjacent contact blade members of the panel board as a one module, two pole circuit breaker.

The illustration of FIGURE 6 shows two adjacent electrical contacts 32 and 33 disposed and positioned to be engageable by two adjacent circuit breakers 38 and 39 of a smaller modular size which in a typical instance may be one-half inch in modular width. The circuit breaker units of the present invention are enclosed in insulating casings having sidewalls of substantially the same outside dimensions and may be joined by suitable means such as the rivet 40 and the common handle tie 41 to form a two pole assembly. Both the circuit breaker 38 and 39 have suitable electrical contact means 38a and 39a, respectively, disposed in their insulating casings and adapted to receive a single blade contact member in electrical engagement therewith. Adjacent electrical panel board contacts such as 32 and 33 illustrated in FIGURE 6 may be connected to different phases of a source of electrical energy and two circuit breakers of one-half module size joined as conceived by the present invention may be connected side by side to different phases of electrical energy by engagement with blade members 32b and 33a as a two-pole, one module unit. Typically, a panel board installation of the present invention may include suitable insulation means such as that shown at 42 in FIGURE 6 disposed between adjacent electrical contact means 32 and 33, particularly when such adjacent contact means are designed to be connected to different phases of an electrical source.

Figure 7:
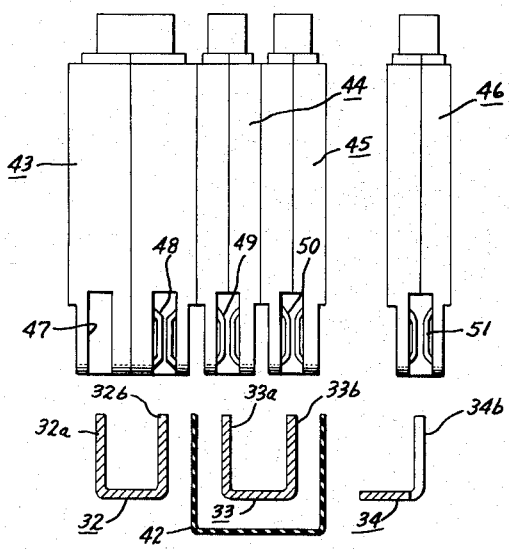
FIGURE 7 is a partially cross-sectional schematic illustration of circuit breakers of different modular sizes aligned for engagement with contact blade members of the panel board of the present invention.

FIGURE 7 illustrates a plurality of circuit breakers 43, 44, 45 and 46 schematically aligned so as to be engageable with electrical contact means disposed on a panel board in accordance with the concept of the present invention. The panel board contact means 32 and 34 may be connected to one phase of an electrical source, while electrical contact means 33 may be connected to a different phase of the same electrical source in the manner generally illustrated in FIGURES 4 and 5. As seen in FIGURE 7, two circuit breakers 44 and 45 of the same smaller modular size as those illustrated in FIGURE 6 may be connected to the same phase of an electrical source by engagement of their respective contact means 49 and 50 with the two blade members 33a and 33b of the panel board contact member 33. A larger modular size circuit breaker 43 is shown in FIGURE 7 aligned for engagement with the panel board contact means 32. Typically such a larger modular size circuit breaker may have a nominal width of one inch as contrasted to the nominal width of one-half inch for the smaller size circuit breakers illustrated in FIGURES 6 and 7.

It will be noted that the larger modular size circuit breaker 43 is enclosed in an insulating casing having sidewalls of substantially the same outside dimensions as the other circuit breakers illustrated and that an electrical contact means 48 is disposed in the insulating casing which is adapted and recessed to receive two of the spaced adjacent blade members such as 32a and 32b. It is important to note that although the insulating casing of the circuit breaker 43 has two recesses therein adapted and disposed to receive adjacent blade members, only one such recess supports an electrical contact means as illustrated at 48, the other recess 47 having the function only of accommodating the adjacent blade member such as 32a without electrical contact. Having a single circuit breaker contact means in the larger modular size circuit breaker affords the advantage that such a larger modular size circuit breaker cannot inadvertently or indiscriminately be connected across two adjacent blade members which are energized by different phases of electrical energy. At the same time, the single contact means 48 possesses fully adequate electrical properties for conduction and contact with the panel board blade member. It will now be evident that the larger size circuit breakers may also be connected in side by side relationship to two different phases of electrical energy in much the same manner as the smaller size circuit breakers of FIGURE 6.

The remaining circuit breaker 46 shown in FIGURE 7 is illustrated in schematic alignment so as to be engageable with the panel board contact means 34b. It will be noted that the panel board contact means 34b is shown partially in cross section with only one blade member appearing because the blade members 34a and 34b are offset from each other with respect to the central axis of the panel board. The offset blades 34a and 34b as illustrated in FIGURES 3, 4, 5 and 7 afford a means of segregating the panel board contact members of the present invention so that only a limited number of circuit breakers of the smaller modular size may be connected into engagement with that segregated portion. For instance, as illustrated in FIGURE 7, though there is adequate space between circuit breakers 45 and 46 to accommodate an additional smaller modular size circuit breaker, there is no contact blade available on the panel board arrangement for its engagement if a smaller modular size circuit breaker were so positioned. Thus, only one smaller modular size circuit breaker may be connected into such a panel board position. In accordance with the concept of the present invention, however, a larger modular size circuit breaker such as that shown at 43 in FIGURE 7 may be connected to the panel board contact means 34b, inasmuch as there is adequate room for such connection and the contact member 48 of the circuit breaker 43 is engageable with the offset blade member 34b. It is usual for panel board assemblies to include appropriate insulation means, such as that shown at 42 between adjacent panel board electrical contacts 32, 33 and 34. However, as was previously explained, the present invention is so conceived that even in the absence of such interposed insulation it is impossible to inadvertently or indiscriminately engage a larger size modular circuit breaker of the present invention in electrical connection across two adjacent blade contact members.

The present invention therefore affords the flexibility and convenience of combining a number of individual circuit breaker units of different modular sizes into multipole circuit breaker assemblies in a broad range of possible combinations as well as accommodating the discrete, selectable connection of different modular sizes of circuit breakers.

Additionally, the inherent limitation of prior art panel board load centers employing upstanding parallel blade contact members which did not accommodate one-half module size circuit breakers in side by side two-pole assembly is overcome by the concept of the present invention. The disposition and configuration of panel board contact members and the co-acting circuit breaker contacts of the present invention provide an arrangement of upstanding contact blades which receive two one-half module size circuit breakers in side by side engagement across two different phases of an electrical source, for instance, within an overall single full module space which was not possible with comparable prior art arrangements.

Moreover, inherent in the concept of the invention is the correlative function of preventing the inadvertent electrical connection of a single larger modular size circuit breaker in a full module space embracing two adjacent contact members which may be energized by different phases of an electrical source.

Additionally, the present invention is conceived to offer the advantage of selectively segregating portions of a panel board so that a limited number of circuit breakers of a particular modular size may be connected into electrical engagement with such segregated portion.

It will be evident to those knowledgeable in the art that the term "circuit breaker" as used in the foregoing description and in the appended claims refers to any device capable of making and/or breaking an electric circuit, including those operable manually or otherwise and including fusible means.

While I have disclosed only certain embodiments of the invention, it will be readily appreciated that many modifications thereof may be made. I therefore intend by the appended claims to cover all such modifications as fall within the true spirit and scope of the invention.

What I claim as new and desire to secure by Letters Patent of the United States is:

1. An electric circuit control device panel board comprising a generally planar base, insulating means mounted on said base, and a plurality of electrical contacts supported on said insulating means, each said electrical contact including at least one pair of parallel joined blade members extending generally normal to the plane of said base, the spacing between said pairs of blade members being equal and said blade members being centrally positioned on said panel board in parallel alignment with the spacing between adjacent blade members of adjacent electrical contacts substantially equal to the spacing between said pairs of blades.

2. An electric circuit control device panel board comprising a generally planar base, insulating means mounted on said base, and a plurality of electrical contacts supported on said insulating means, each said electrical contact including at least one pair of parallel blade members extending generally normal to the plane of said base, and being joined by a common bottom portion in a generally U-shaped channel configuration the spacing between said pairs of blade members being equal and said blade members being centrally positioned on said panel board in parallel alignment with the spacing between adjacent blade members of adjacent electrical contacts substantially equal to the spacing between said pairs of blades.

3. An electric circuit control device panel board comprising a generally planar base, insulating means mounted on said base, and a plurality of electrical contacts supported on said insulating means, each said electrical contact including at least one pair of parallel joined blade members extending generally normal to the plane of said base, the spacing between said pairs of blade members being equal and said blade members being centrally positioned on said panel board in parallel alignment with the spacing between adjacent blade members of adjacent electrical contacts substantially equal to the spacing between said pairs of blades, and at least one pair of said blades being offset from each other with respect to the central axis of said panel board.

4. An electric circuit control device panel board comprising a generally planar base, insulating means mounted on said base, a plurality of electrical contacts supported on said insulating means, each said electrical contact including at least one pair of parallel blade members extending generally normal to the plane of said base, and being joined by a common bottom portion in a generally U-shaped channel configuration the spacing between said pairs of blade members being equal and said blade members being centrally positioned on said panel board in parallel alignment with the spacing between adjacent blade members of adjacent electrical contacts substantially equal to the spacing between said pairs of blades, and separate electrically conductive means connected to three adjacent electrical contacts of said plurality of electrical contacts, whereby said panel board is connectable to a three-phase source of electrical energy.

5. An electric circuit control device panel board adapted to electrically receive and engage a plurality of control devices of module width and integral multiples of said module width comprising a generally planar base, insulating means mounted on said base, and a plurality of electrical contacts, each said electrical contact including at least one pair of parallel joined blade members spaced from each other by substantially said module width, said blade members being centrally positioned on said panel board in parallel alignment with the spacing between adjacent blade members of adjacent electrical contacts substantially equal to said module width.

6. An electric circuit control device panel board adapted to electrically receive and engage a plurality of control devices of module width and integral multiples of said module width comprising a generally planar base, insulating means mounted on said base, and a plurality of electrical contacts, each said electrical contact including at least one pair of parallel joined blade members spaced from each other by substantially said module width, said blade members being centrally positioned on said panel board in parallel alignment with the spacing between adjacent blade members of adjacent electrical contacts substantially equal to said module width, and at least one pair of said blade members being disposed on opposite sides of the central axis of said panel board.

7. An electric circuit control device panel board comprising a generally planar base, insulating means mounted on said base, a plurality of electrical contacts supported on said insulating means, each said electrical contact including two spaced blade members extending generally normal to the plane of said base and joined by a common bottom portion in a generally U-shaped channel configuration, said blades being centrally positioned on said panel board and aligned in equally spaced parallel relationship, and a plurality of circuit breakers of first and second modular size, said circuit breakers of said first modular size having a width substantially equal to the space encompassed by three adjacent blade members and an electrical contact means disposed in an insulating casing adapted to receive any two adjacent blade members and said circuit breakers of said second modular size having a width substantially equal to the space encompassed between two adjacent blade members and an electrical contact means disposed in an insulating casing adapted to receive one of said blade members.

8. An electric circuit control device panel board comprising a generally planar base, insulating means mounted on said base, a plurality of electrical contacts supported on said insulating means, each said electrical contact including two spaced blade members extending generally normal to the plane of said base and joined by a common bottom portion in a generally U-shaped configuration, said blades being centrally positioned on said panel board and aligned in equally spaced parallel relationship with at least two of said adjacent electrical contacts connected to different sources of electrical energy, and a two-pole circuit breaker assembly of two circuit breaker units enclosed in insulating casings having side walls of substantially the same outside dimensions and disposed in side-by-side relationship, each said circuit breaker having a width substantially equal to the equal spacing between adjacent blade members and having an electrical contact centrally disposed near a bottom corner of its casing and an externally extending handle, said handles being joined by a common member.

9. For use with a first type of plug-in electrical control device having a generally rectangular insulating casing of predetermined width and with a second type of plug-in electrical control device having a generally rectangular casing of width substantially twice said predetermined width, an electric circuit control device panelboard, comprising:

(a) a support;
(b) at least one elongated electrical bus bar supported on said support;
(c) a plurality of electrical contacts supported on said support, at least some of said contacts being electrically connected to said bus bar;
(d) said contacts being disposed in substantially equally spaced alignment in a row generally centrally of said support;
(e) at least some of said contacts each comprising a compound stab-type contact having a first pair of contacting portions in side-by-side relation on a line extending substantially normal to said row and a second pair of contacting portions in side-by-side relation on a line extending substantially normal to said row, said second pair of contact portions being spaced from said first pair of contact portions along the length of said row, and in alignment therewith, and each of said contactt portions being dimensioned to receive and electrically connect one of said first control devices.

10. For use with a first type of plug-in electrical control device having a generally rectangular insulating casing of predetermined width and with a second type of plug-in electrical control device having a generally rectangular casing of width substantially twice said predetermined width, an electric circuit control device panelboard, comprising:

(a) a support;
(b) at least two elongated electrical bus bars supported in spaced parallel insulated relation on said support;
(c) a plurality of electrical contacts supported on said support, at least some of said contacts being electrically connected to each of said bus bars respectively;
(d) said contacts being disposed in substantially equally spaced alignment in a row parallel to said bus bars and substantially mid-way between said bus bars;
(e) at least some of said contacts each comprising a compound stab-type contact having a first pair of contacting portions in side-by-side relation on a line extending substantially normal to said row and a second pair of contacting portions in side-by-side relation on a line extending substantially normal to said row, said second pair of contact portions being spaced from said first pair of contact portions along the length of said row, and in alignment therewith, and each of said contact portions being dimensioned to receive and electrically connect one of said first control devices.

11. An electric circuit control device panelboard as set forth in claim 10, at least certain of said contacts having two of said contact portions removed whereby said certain contacts can receive and electrically connect only two of said first control devices and two of said second control devices selectively.

References Cited by the Examiner

UNITED STATES PATENTS 3,174,077  3/1965  Wippermann et al. ___ 317—119
3,198,992  8/1965  Norden _____ 317—119

ROBERT K. SCHAEFER, *Primary Examiner.*

J. J. BOSCO, *Assistant Examiner.*